(12) United States Patent
Burnette

(10) Patent No.: US 7,005,574 B2
(45) Date of Patent: Feb. 28, 2006

(54) ELECTRICAL METALLIC TUBE, COUPLING, AND CONNECTOR APPARATUS AND METHOD

(75) Inventor: David Ruffin Burnette, Swarthmore, PA (US)

(73) Assignee: John Maneely Company, Collingswood, NJ (US)

( * ) Notice: Subject to any disclaimer, the term of this patent is extended or adjusted under 35 U.S.C. 154(b) by 0 days.

(21) Appl. No.: 10/910,821

(22) Filed: Aug. 4, 2004

(65) Prior Publication Data

US 2005/0006122 A1    Jan. 13, 2005

Related U.S. Application Data

(62) Division of application No. 10/425,358, filed on Apr. 28, 2003, now Pat. No. 6,797,877.

(60) Provisional application No. 60/360,723, filed on May 15, 2002.

(51) Int. Cl.
*H02G 3/04* (2006.01)

(52) U.S. Cl. ............... 174/48; 174/65 R; 174/68.1; 138/177

(58) Field of Classification Search ............ 174/48, 174/65 R, 51, 68.3, 50, 68.1, 65 SS; 439/92, 439/95, 98, 142; 138/177, 103; 285/355, 285/81, 390
See application file for complete search history.

(56) References Cited

U.S. PATENT DOCUMENTS

| | | | |
|---|---|---|---|
| 1,659,094 A | 2/1928 | Godfrey | |
| 3,306,838 A | 2/1967 | Rubin | |
| 3,832,672 A | 8/1974 | Loos | |
| 4,652,018 A | 3/1987 | Boghosian | |
| 5,731,543 A | 3/1998 | Jorgensen | |
| 5,799,984 A | 9/1998 | Reynolds | |
| 5,912,431 A | 6/1999 | Sheehan | |
| 6,080,933 A * | 6/2000 | Gretz | 174/65 R |
| 6,114,630 A | 9/2000 | Gretz | |
| 6,352,439 B1 * | 3/2002 | Stark et al. | 439/142 |
| 6,444,907 B1 | 9/2002 | Kiely | |
| 6,527,302 B1 | 3/2003 | Gault | |
| 6,596,939 B1 | 7/2003 | Gretz | |
| 6,604,400 B1 | 8/2003 | Gretz | |
| 6,655,750 B1 | 12/2003 | Soupal | |
| 6,670,553 B1 | 12/2003 | Gretz | |
| 6,682,355 B1 * | 1/2004 | Gretz | 439/98 |

* cited by examiner

*Primary Examiner*—Dhiru R. Patel
(74) *Attorney, Agent, or Firm*—Cozen O'Connor, P.C.; Michael B. Fein

(57) ABSTRACT

A labor saving system, method, and apparatus for connecting or coupling lengths of electric metallic tubing ("EMT"). The invention uses couplings/connectors that have barbs that are designed to engage corresponding indentations on EMT to ensure proper installation. In one aspect, the invention is an EMT having: an EMT inner surface forming an EMT cavity; an EMT outer surface; an EMT first end; and at least one indentation in the EMT outer surface at or near the EMT first end, the indentation adapted to receive a corresponding barb from a sleeve device. In another aspect, the invention is a sleeve device comprising; a sleeve inner surface forming a sleeve cavity adapted to receive an end of an EMT; a sleeve outer surface; a first sleeve end; at least one barb on the sleeve inner surface at or near the first sleeve end, the barb adapted to engage a corresponding indentation on the EMT.

11 Claims, 8 Drawing Sheets

ELECTRICAL METALLIC TUBE, COUPLING, AND CONNECTOR APPARATUS AND METHOD

CROSS-REFERENCE TO RELATED APPLICATION

This application is a divisional application of U.S. patent application Ser. No. 10/425,358, filed Apr. 28, 2003, now U.S. Pat. No. 6,797,877 which claims the benefit of U.S. Provisional Patent Application No. 60/360,723, filed May 15, 2002, both of which are hereby incorporated by reference in their entireties.

TECHNICAL FIELD OF THE INVENTION

This invention relates to the field of tubing. More particularly, the invention relates to the field of electrical metallic tubing ("EMT") apparatus including tubing, connectors and couplings, methods of coupling sections of EMT, and methods of connecting EMT to other apparatus such as junction boxes or transition fittings.

BACKGROUND ART

Currently EMT is connected by using one of two methods, either a set screw coupling or a compression coupling. The connectors are made from either electroplated steel or from die cast zinc. Set screw EMT couplings are sleeves which slip over the outside diameter of two opposing EMTs. Set screw EMT couplings typically have an inner ridge to make sure that the two pieces of EMT butt up properly to the center of the coupling. The coupling has set screw(s) that penetrate the wall of the coupling and when tightened create both a ground path and a tight fit.

Compression couplings are made of three "body parts" plus a split gland ring. The inner body is threaded on each end and then the split gland ring is slipped on and then the "outer body" on each end is threaded onto the inner body. By tightening the outer body ends, the split gland ring is tightened around the EMT, providing a tight fit and a good ground path.

In the installation of EMT, provisions have to be made to address the need for a good ground path. Concerns have frequently been raised by inspectors and regulators about the integrity of the ground path of steel EMT. The integrity of the ground path may be degraded if the set screws or compression sleeves are not tightened fully because electrical continuity relies on good, tight connections at each connection or coupling point.

Traditional set screw connectors are basically the same as couplings except one end is threaded or has some other type of attaching mechanism so that the EMT can be attached to an enclosure, such as a junction box or some other piece of equipment that has a knock out hole of the correct size for the connector to fit. Connectors are usually held in place with locknuts that lock the connector into place and provide a continued ground path.

Existing EMT couplings and connectors require the installer to either turn a set screw or turn an "outer body." The need to "tighten" a set screw or "turn" an outer body not only requires additional work space but is also subject to human error, such as inadequate tightening. If threaded connections are subject to vibration, the screws and/or outer bodies can loosen over time, compromising the ground path. Moreover, "twist tightening" increases the time and effort it takes for mechanics to install EMT. Thus, a need exists for an EMT coupling and connector system and method that does not require set screw or other means of twist tightening while still providing a proper ground path.

Currently available snap fit connectors and couplings are expensive to manufacture and provide a less than optimal ground path.

DISCLOSURE OF THE INVENTION

It is an object of the present invention is to provide EMT, connector, coupling, method for connecting, and method for coupling which are quick and efficient to install.

It is a further object of the present invention is to provide an EMT, a connector for an EMT, and a coupling for an EMT that provides a safe and reliable ground path which does not depend on set screws being tightened and remaining tightened.

A still further object of the present invention is to provide an EMT, a connector for an EMT, and a coupling for an EMT that is efficient to manufacture.

Yet another object is provide an EMT, a connector for an EMT, and a coupling for an EMT that is easy to use and capable of being used in existing systems and equipment.

These and other objects are achieved by the present invention which in one aspect comprises an electrical metallic tube ("EMT") comprising an inner surface forming an EMT cavity; an EMT outer surface; an EMT first end; and at least one indentation in the EMT outer surface at or near the EMT first end, the indentation adapted to receive a corresponding barb from a sleeve device. The EMT is preferably manufactured with a number of dimples that are pressed or punched into the EMT outer surface close to the EMT first end around its circumference. The number of dimples and the distance from the EMT first end depend on the size required to meet the necessary pull out tests and other criteria. The dimples are preferably shaped like a capital D with the flat side facing the EMT first end and the rounded side facing the center. The indentation can also be a linearly-shaped dimple or roll groove around the entire EMT outer surface so there is a continuous area for the barbs of the sleeve device to snap into. The indentation is preferably a minimal depth so as to not cause a loss in wiring capacity through the EMT cavity.

It is further preferable that the inventive EMT have an EMT second end having a mirror image indentation arrangement as the EMT first end. Preferably, each length of EMT will have four indentations at or near each of its ends. Moreover, because the indentation would not be raised above the EMT outside surface, the inventive EMT can be used with traditional connectors/couplings available in the market place, which typically slip over the outside diameter of the EMT if the inventive couplings/connectors are not available.

In another aspect, the invention is a sleeve device for connecting EMT comprising: a sleeve inner surface forming a sleeve cavity adapted to receive an end of an EMT; a sleeve outer surface; a first sleeve end; and at least one barb on the sleeve inner surface at or near the first sleeve end. The barb is adapted to engage a corresponding indentation on the EMT described above. Depending on design needs in the field, the sleeve device can be adapted to be either a coupling or a connector by appropriately designing the opposing end of the sleeve device.

The sleeve device is preferably designed to have a C-shaped cross sectional profile and is constructed of spring steel. When the sleeve device is used to directly receive an EMT, the sleeve cavity preferably has a diameter that is slightly larger than the diameter of the EMT outer surface. When the sleeve device is used in conjunction with a linking device, as discussed below, the sleeve cavity will preferably have a diameter that is slightly larger than the diameter of the outer surface of the linking device. The barbs are designed to slide over the EMT outer surface and "snap" into the corresponding indentations (or the roll groove) on the EMT. Preferably, the barb would point down and slightly back and will "capture" or "contact" the flat part of the D-shaped dimple or linearly-shaped dimple. If the sleeve device needs to be removed from the inventive EMT, the sleeve device could be spun or twisted and the barbs would free up as the spinning would result in the barb sliding over the rounded part of the (D) or slotted depression. It is preferred that the sleeve device have four barbs at or near its first sleeve end for engaging four corresponding indentations on the EMT. The barbs help provide a ground path for the EMT by increasing the area of contact.

It further preferable that the sleeve device further comprise at least one ground tab formed by a slot in the sleeve device. The ground tab can be bent downward so that the ground tab would scrape the outer surface of the EMT, resulting in additional contact area. This helps to enhance the current carrying capability and helps to maintain electrical continuity throughout the system.

In order to be able to use the sleeve device on cut EMT or EMT manufactured without indentations at its ends, the sleeve device preferably includes a set screw locking mechanism similar to traditional EMT set screw fittings. This allows maximum flexibility and eliminates the need for the field mechanic to carry two types of couplings/connectors. In this embodiment, the sleeve device will comprise a set screw hole extending through the sleeve outer surface and the sleeve inner surface for threadily engaging a set screw.

When the sleeve device is used to join two lengths of the inventive EMT, i.e., it is used as a coupling, the sleeve device will comprise a second sleeve end having a mirror image barb arrangement as the first sleeve end. Preferably, there will be four barbs at or near the second sleeve end for engaging corresponding indentations on the second length of EMT. It is further preferable for the connection sleeve to comprise a middle inner ridge on the sleeve inner surface at or near a center of the sleeve device. By sliding the EMT into the sleeve cavity of the sleeve device and butting it against the inner ridge, proper installation is assured.

In yet another aspect, the invention comprises a linking device for EMT comprising: a first section having a link inner surface forming a link cavity, a link outer surface, and at least one barb access hole adapted to allow a corresponding barb of a sleeve device to extend therethrough when the sleeve device is fitted around the first section; a second section; and a separator between the first and second sections.

The linking device is preferably made of die-cast zinc and is designed to be used in conjunction with the sleeve device. The linking device can be designed to couple two lengths of EMT together or can be used to connect a length of EMT to a junction box, splice box, wireway, or other enclosure or transition fitting.

It is preferable that the first section of the linking device further comprise a ground tab hole adapted to allow the ground tab of the sleeve device to extend therethrough when the sleeve device is fitted around the first section. It is also preferable that the first section comprise four barb access holes and a set screw hole. The set screw hole should be adapted to be substantially aligned with a set screw hole on the sleeve device when the sleeve device is fitted around the first section. A set screw can be extended through the set screw hole of the linking device.

The linking device can also comprise an outer ridge around the outside surface of the first section at a first link end. This helps ensure that the sleeve device is properly positioned when fitted around the linking device.

When the linking device is used as a connector, i.e., to connect a length of EMT to a junction box or other transition fitting, it is preferable that the second section be adapted to do so by incorporating a threaded outside surface or a snap fit assembly on the second section.

When the linking device is used as a coupling, i.e., to connect two lengths of EMT, the link cavity extends through the second section so that the second section has a link inner surface and a link outer surface that mirrors the first section. In this embodiment, the second section will have at least one barb access hole, at least one ground tab hole, and at least one set screw hole.

In still another aspect, the invention is a connection assembly for EMT comprising a combination of the linking device and the sleeve device, wherein the sleeve device is fitted around the first section of the linking device so that the barb on the sleeve device extends through the barb access hole of the linking device. By varying the design of the second section of the linking device, the connection assembly can be used to couple two lengths of EMT or connect a single length of EMT to a junction box or other transition fitting.

In a still further aspect, the invention is an EMT joint assembly comprising: an EMT having an EMT inner surface forming an EMT cavity, an EMT outer surface; an EMT first end, and at least one indentation in the EMT outer surface at or near the EMT first end, the indentation engaging a corresponding barb from a sleeve device; the sleeve device having a sleeve inner surface forming a sleeve cavity adapted to receive an end of the EMT, a sleeve outer surface; a first sleeve end; and at least one of the corresponding barbs on the sleeve inner surface at or near the first sleeve end. The EMT joint assembly is preferably constructed as discussed above.

In another aspect, the invention is a method of connecting EMT. When used to connect cut EMT or EMT manufactured without indentations at its ends, the method comprises: providing an EMT having an inner surface forming an EMT cavity, an EMT outer surface, and an EMT first end; providing a sleeve device having a sleeve inner surface forming a sleeve cavity adapted to receive the EMT first end, a sleeve outer surface, a first sleeve end, and at least one barb on the sleeve inner surface at or near the first sleeve end; and inserting the EMT into the sleeve cavity.

When used to connect or couple EMT having at least one indentation in the EMT outer surface at the EMT first end, the barb will engage the indentation when the EMT is inserted into the sleeve cavity. Preferably, a ground tab on the sleeve device will be bent inwardly to contact the EMT. Moreover, the inventive method can be used to connect the EMT and sleeve device to a junction box or transition fitting through the use of a linking device, as described above.

The present invention significantly reduces the time required for electricians and installers to connect EMT and addresses a serious safety concern often raised regarding the installation of EMT. The present invention eliminates the time-consuming complexity of the existing connection methods by allowing the EMT to simply snap together while providing improved and more reliable ground paths. The invention offers the installer the option of using the new labor saving fittings or to continue to use traditional fittings with no loss in installation time or performance. Moreover, the loss of interior wire fill space will be insignificant. The installed cost of the raceway system will be significantly reduced while, most importantly, the concerns of poor workmanship resulting in poor ground path and potential safety hazards will be extremely reduced or eliminated.

MODES FOR CARRYING OUT THE INVENTION

Figure 1:
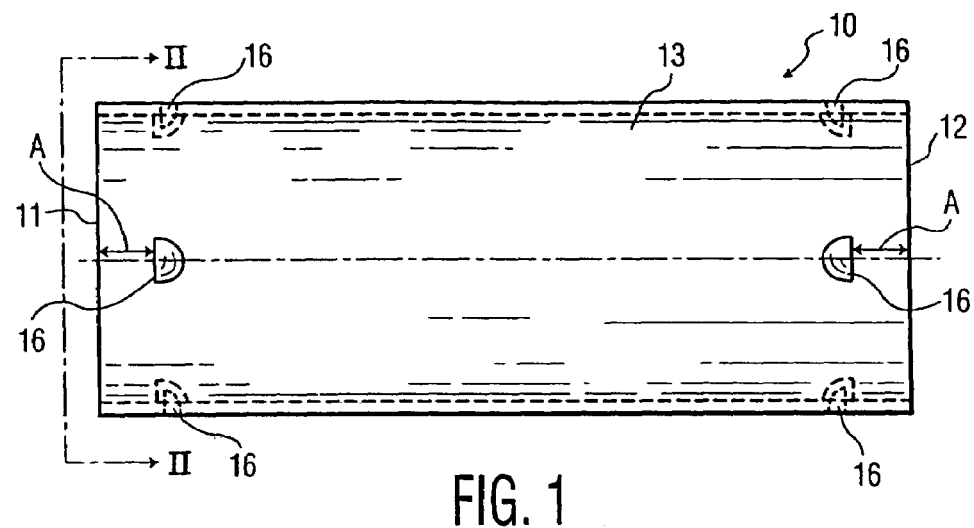
FIG. 1 is a side view of an embodiment of a length of EMT having D-shaped indentations.
Figure 2:
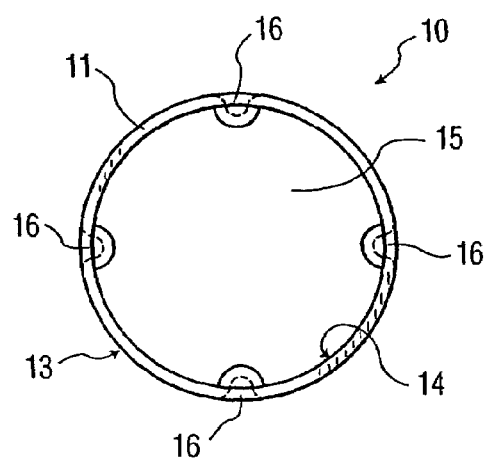
FIG. 2 is a front view of the EMT of FIG. 1 along line II—II.
Figure 3:
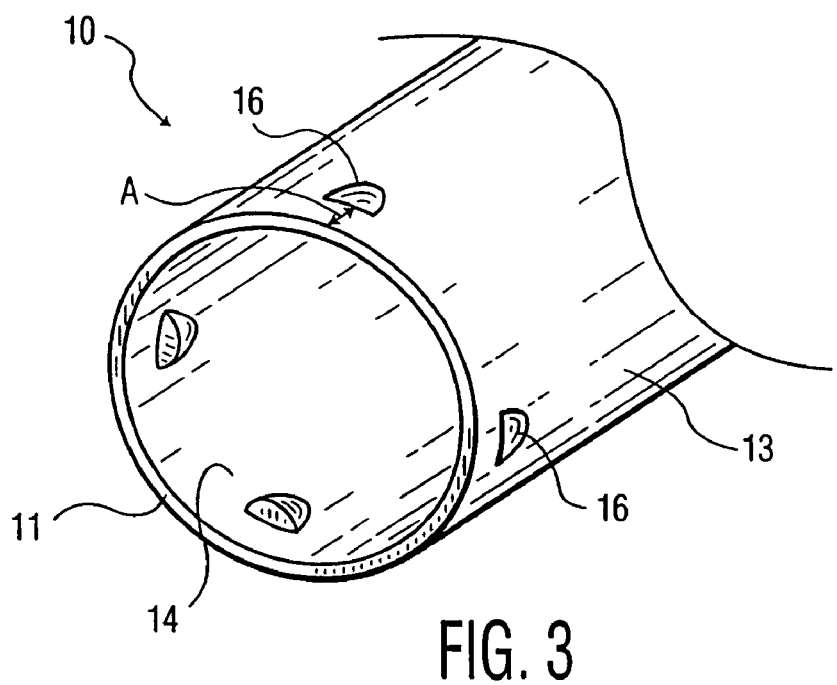
FIG. 3 is a perspective view of a portion of the EMT of FIG. 1.

Referring to FIGS. 1–3, an embodiment of a length of EMT is illustrated according to the present invention. EMT 10 has tubular shape and a circular cross-sectional profile. EMT 10 can be constructed of steel, alloys, aluminum, or any other metal or material capable of carrying electricity. EMT 10 has an outer surface 13 and an inner surface 14. EMT 10 has EMT first end 11 and EMT second end 12. Inner surface 14 forms EMT cavity 15 extending through the length of EMT 10 for holding wire.

Figure 6:
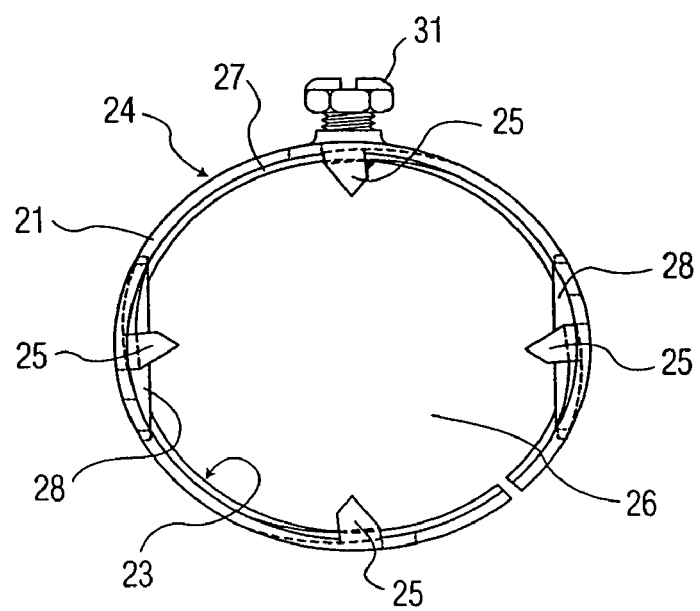
FIG. 6 is a front view of the sleeve coupling of FIG. 5 along line VI—VI.
Figure 7:
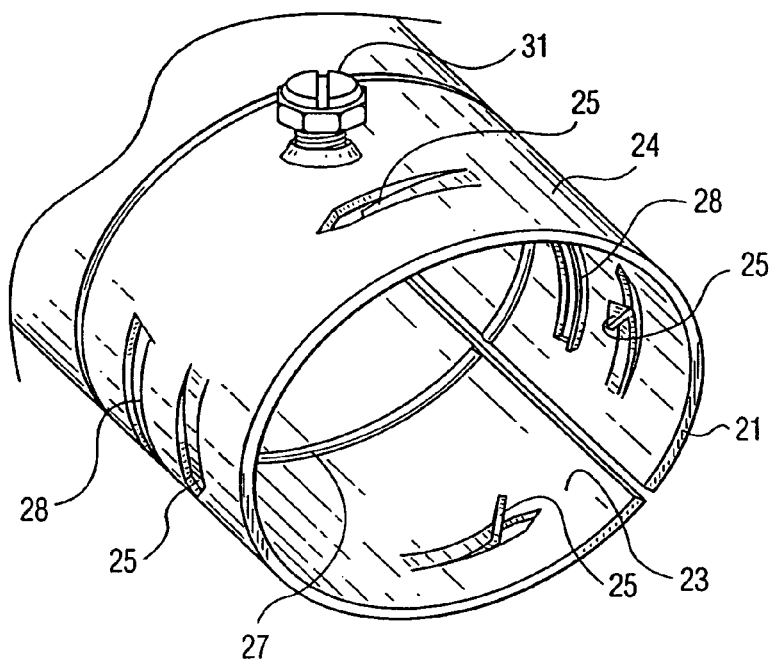
FIG. 7 is a perspective view of a portion of the sleeve coupling of FIG. 5.

EMT 10 further comprises indentations, in the form of D-shaped dimples 16, at both EMT first end 11 and EMT second end 12. Each of the D-shaped dimples 16 are adapted to receive and engage a corresponding barb 25 of sleeve device 20 (FIGS. 6 and 7). EMT 10 comprises four D-shaped dimples 16 circumferentially located around each of its ends 11, 12. D-shaped dimples 16 are formed in outer surface 13 by punching or pressing and preferably have a depth of approximately one-eighth inch. EMT 10 is one and one-half inch EMT pipe (i.e. one and one-half inch diameter) but can take on any size and still be within the scope of the present invention.

Figure 5:
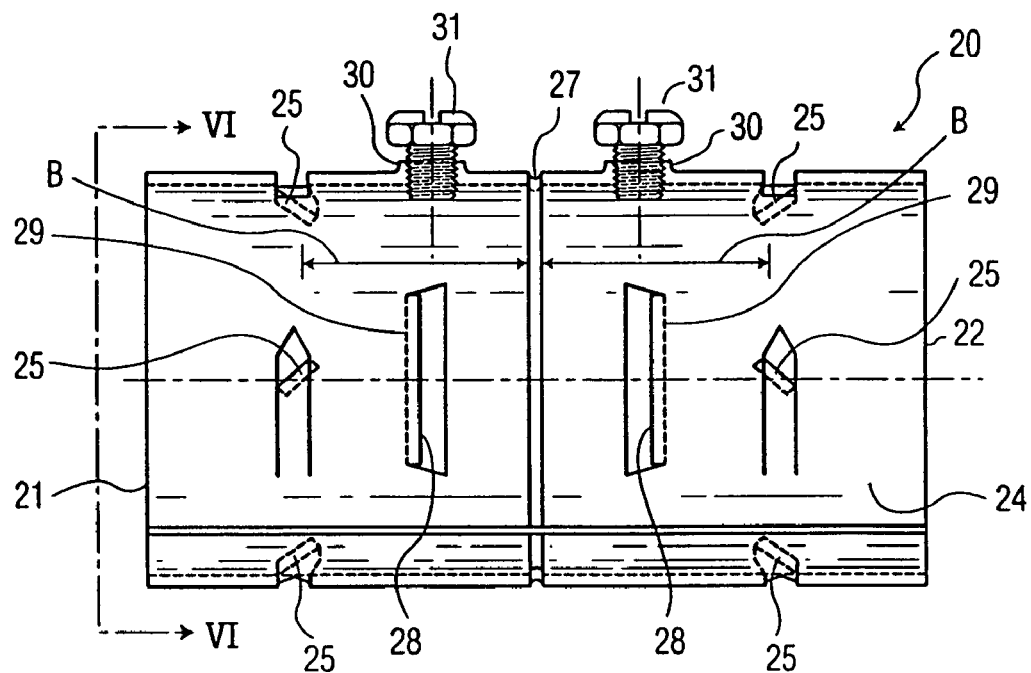
FIG. 5 is a is a side view of an embodiment of a sleeve coupling according to the present invention.

D-shaped-dimples 16 are located a distance A from EMT first and second ends 11, 12. Distance A is substantially equal to distance B, the distance that barbs 25 are located from first and second sleeve ends 21, 22 (FIG. 5). D-shaped dimples 16 also correspond to the circumferential orientation of barbs 25 on sleeve coupling 20 (FIG. 5).

Figure 4:
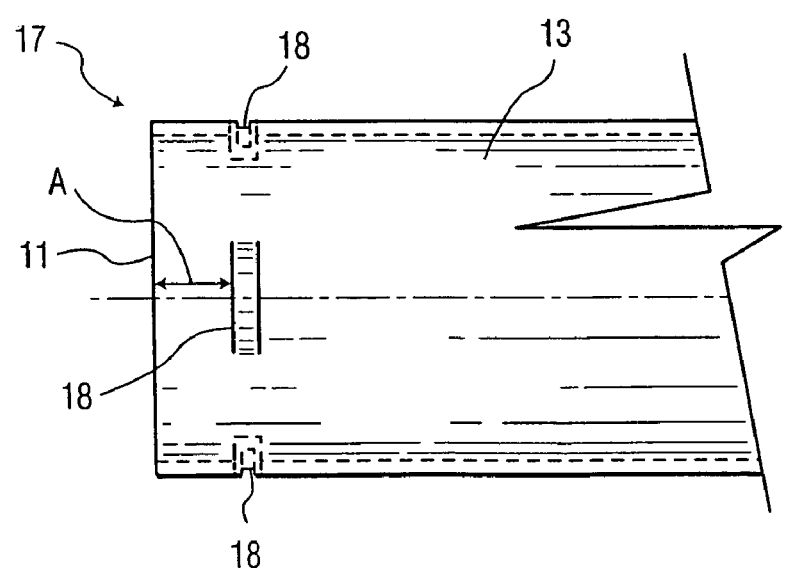
FIG. 4 is a side view of an end portion of an EMT having linearly-shaped indentations.

Referring now to FIG. 4, EMT 17 is illustrated according to a second embodiment of the present invention. In this alternative embodiment, EMT 17 has four linearly shaped grooves 18 in outer surface 13 instead of the D-shaped dimples 16. Similar to D-shaped dimples 16, linearly shaped grooves 18 are adapted to receive and engage a corresponding barb 25 of sleeve coupling 20 (FIGS. 6 and 7). While two examples of the indentation on outer surface 13 have been illustrated, those skilled in the art will appreciate that the indentation(s) can take on almost any shape or size, including a roll groove that extends around the entire circumference of outer surface 13.

Figure 14:
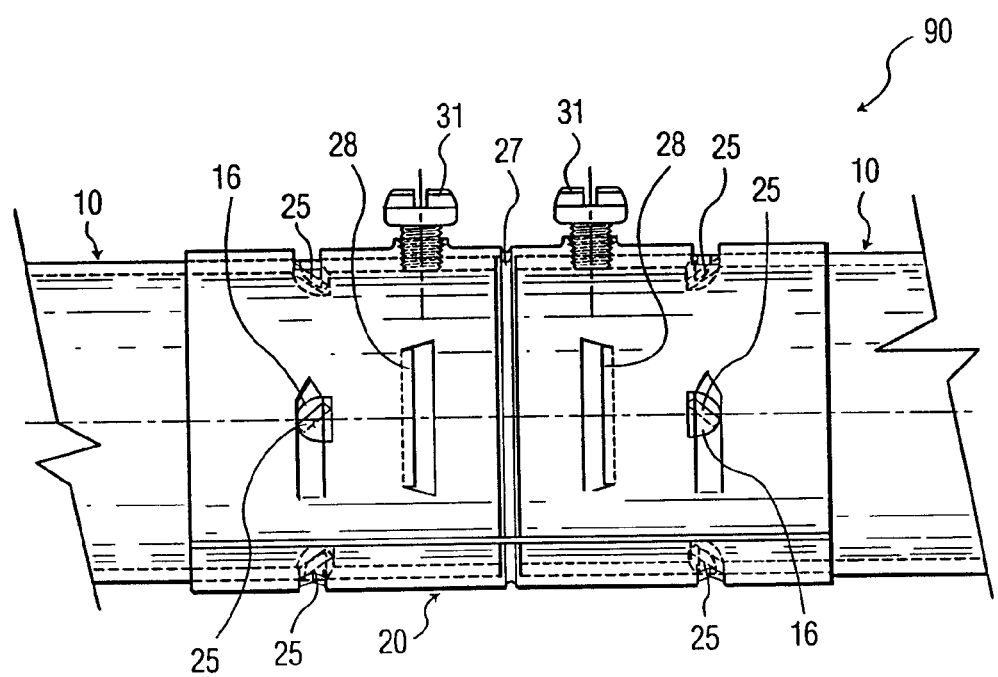
FIG. 14 is a side view of an embodiment of an EMT joint assembly comprising the sleeve coupling of FIG. 5 connecting two lengths of the EMT of FIG. 1.

FIGS. 5–7 illustrate an embodiment of a sleeve coupling according to the present invention. Sleeve coupling 20 is designed to be used to connect two lengths of EMT 10 (as shown in FIG. 14). However, those skilled in the art will appreciate that sleeve coupling 20 can be modified to be a connector, which can be used a single length of EMT to a junction box or any type f transition fitting.

Sleeve coupling 20 comprises a first sleeve end 21 and a second sleeve end 22. Sleeve device 20 is constructed of spring steel and has a C-shaped cross sectional profile (visible in FIG. 6). The C-shaped cross-sectional profile and the steel spring construction allow sleeve coupling 20 to be easily fitted around EMT 10 (FIG. 14) without damaging barbs 25. Sleeve coupling 20 has an inner sleeve surface 23 and an outer sleeve surface 24. Inner sleeve surface 23 forms sleeve cavity 26, which extends the length of sleeve coupling 20. Sleeve cavity 26 is sized and shaped so as to be capable of receiving one of the EMT ends 11 or 12 of EMT 10 (FIG. 1). Sleeve coupling 20 preferably comprises a middle inner ridge 27 on inner sleeve surface 23 near the center of sleeve coupling 20. Middle inner ridge 27 acts a "stop" for EMT that is inserted into sleeve cavity 26.

Sleeve coupling 20 further comprises four barbs 25 at each of its sleeve ends 21, 22. The barb arrangement on second sleeve end 22 is the same as the barb arrangement on first sleeve end 21. Barbs 25 are formed by punching or pressing the steel and bending the barbs inward and back. Optionally, the steel will be heat tempered thereafter. Barbs 25 are designed to slide over the EMT outer surface 13 and "snap" into corresponding D-shaped dimples 16 (FIG. 1). Preferably, the barbs will point down and slightly back and will "capture" or "contact" the flat part of the D-shaped dimple 16 (FIG. 1).

Sleeve coupling 20 also has ground tab 28. Ground tab 28 is formed by a punched or pressed slot. Ground tab can 28 can be bent inward along dotted line 29 so that ground tab 28 will contact EMT outer surface 13 when EMT 10 is positioned in sleeve cavity 26 (as illustrated in FIG. 14). This helps to enhance the current carrying capability and helps to maintain electrical continuity throughout the system.

Sleeve coupling 20 further comprises set screw hole 30 having set screw 31 threadily engaged therethrough. Set screw 31 is preferably a hex-shaped screw. This set screw feature allows sleeve device 20 to be used in conjunction with cut EMT or EMT manufactured without indentations at its ends. This allows maximum flexibility and eliminates the need for the field mechanic to carry two types of couplings/connectors.

Sleeve coupling 20 can be modified to be a connector to be used to connect a length of EMT to a junction box or other transition fitting. In the connector embodiment, the second sleeve end will be adapted to connect to a junction box or other transition fitting by modifying the outer sleeve surface near the second sleeve end to be threaded or by incorporating a snap fit assembly. In this embodiment, the second sleeve section will be solid and be constructed similar to second link section 42 shown in FIG. 8.

Figure 8:
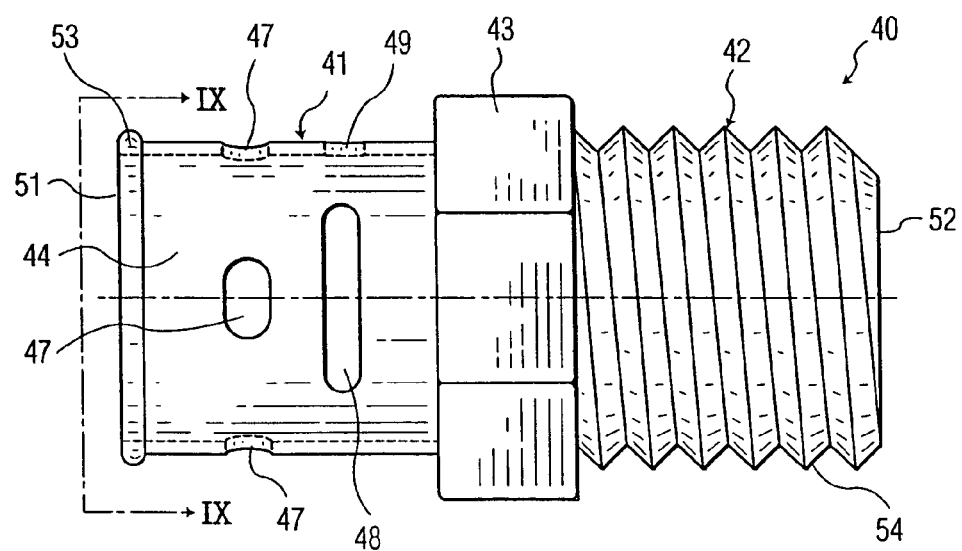
FIG. 8 is a side view of an embodiment of a linking device adapted to connect a length of EMT to a junction box according to the present invention.
Figure 9:
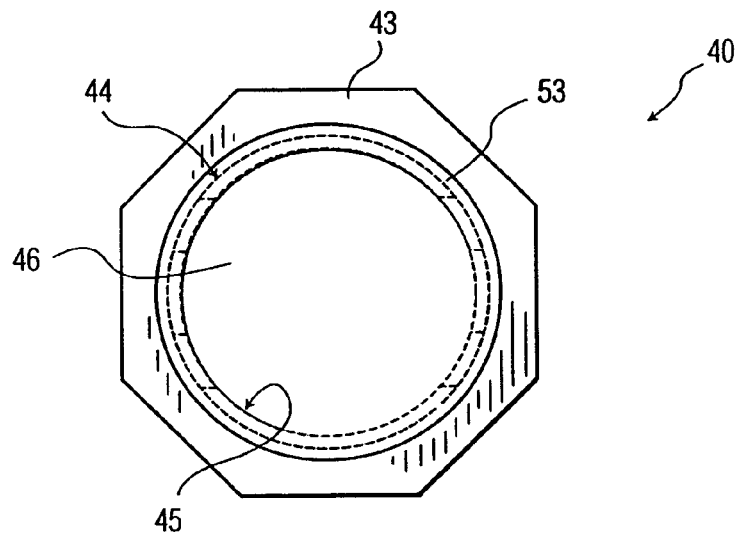
FIG. 9 is a front view of the linking device of FIG. 8 along line IX—IX.
Figure 10:
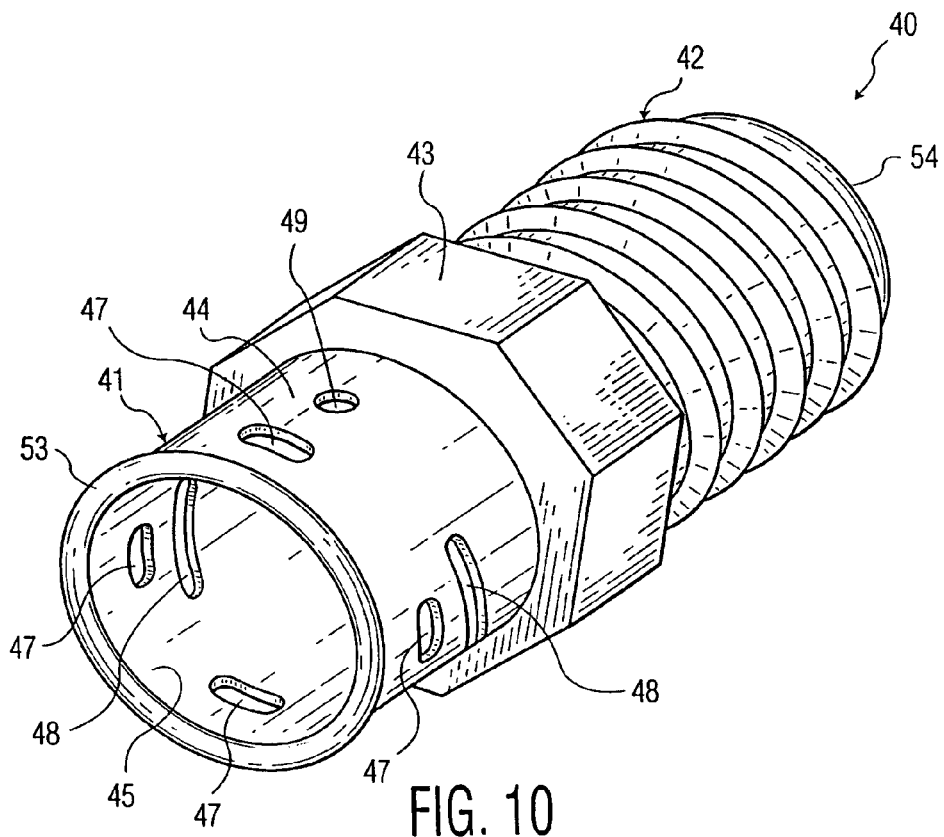
FIG. 10 is a perspective view of the linking device of FIG. 8.

Referring now to FIGS. 8–10, linking connector 40 is illustrated. Linking connector 40 has first section 41 and second section 42. First section 41 and second section 42 are separated by hex-shaped separator 43. Separator 43 not only acts to separate sections 41 and 42 but can also be used to turn linking connector 40 if necessary.

Figure 12:
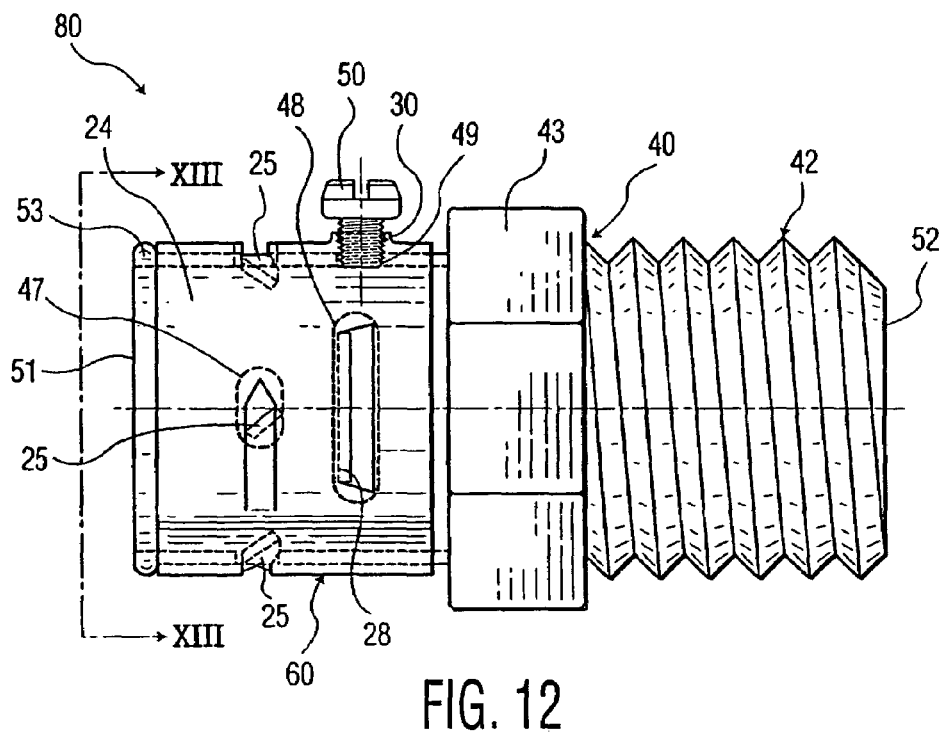
FIG. 12 is a side view of an embodiment of a connection assembly comprising the linking device of FIG. 8 and a sleeve half.
Figure 13:
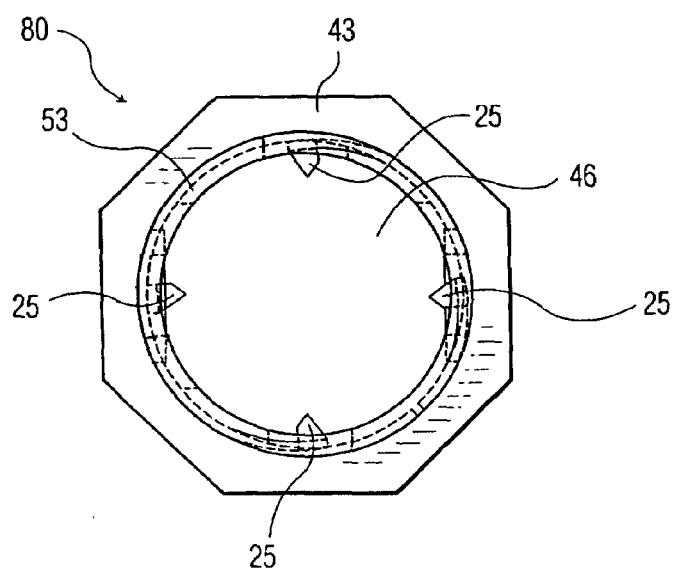
FIG. 13 is a front view of the connection assembly of FIG. 12 along line XIII—XIII.

First section 41 has a link outer surface 44 and a link inner surface 45. Link inner surface 45 forms link cavity 46. Link cavity 46 is sized and shaped to receive one of end 11, 12 of EMT 10. First section 41 further comprises four barb access holes 47 and two ground tab holes 48. Barb access holes 47 are sized and positioned on first link section 41 so as to allow a corresponding barb 25 of sleeve half 60 to extend therethrough when sleeve half 60 is fitted around first link section 41, as shown in FIGS. 12 and 13. Similarly, ground tab holes 48 are positioned and sized to allow a corresponding ground tab 28 of sleeve half 60 to extend therethrough when the sleeve half 60 is fitted around first link section 41, as shown in FIGS. 12 and 13. First section 41 also has set screw hole 49. Set screw hole 49 is adapted to allow set screw 50 to extend therethrough (FIG. 12). Set screw 50 is preferably a hex-shaped screw. Alternatively, set screw hole 49 can be a threaded hole so as to threadily engage set screw 50. When set screw hole 49 is threaded, is not necessary that set screw hole 30 on half sleeve 60 be threaded (FIG. 12).

Finally, linking connector 40 comprises a first link end 51 and a second link end 52. First section 41 preferably has outer ridge 53 circumferentially located on outside surface 44 at or near first link end 51. Outer ridge 53 helps ensure that sleeve half 60 is properly positioned on first section 41 when it is fitted around linking connector 40, as illustrated in FIG. 12.

Second section 42 of linking connector 40 is adapted to engage a junction box or other transition fitting (not illustrated). This is done by threading outside surface 54. Alternatively, a snap fit assembly or any other connection means can be incorporated into second section 42.

Figure 11:
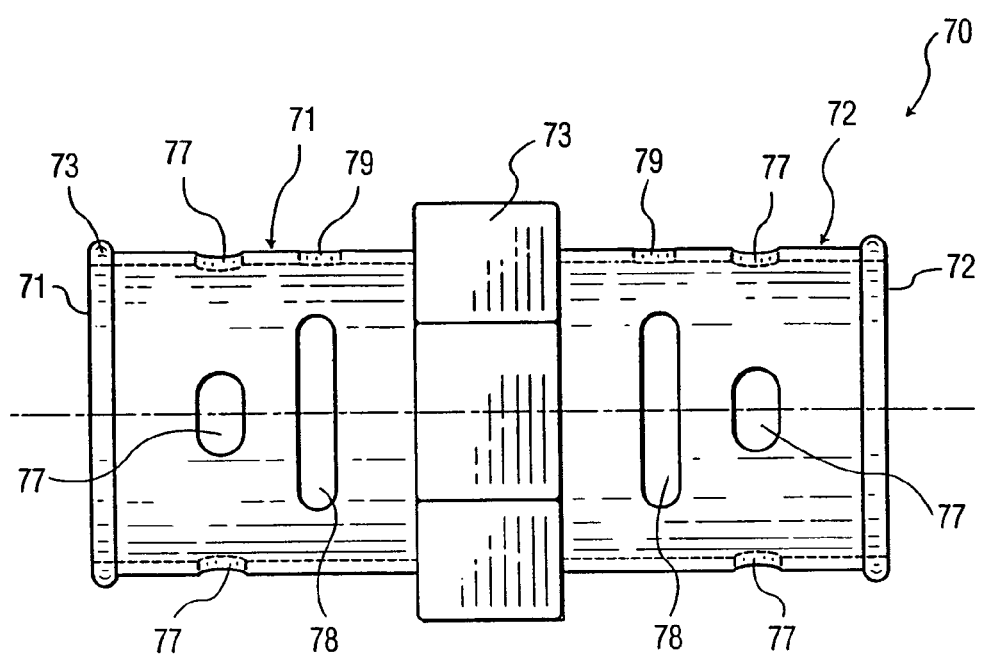
FIG. 11 is a side view of an embodiment of a linking device adapted to connect two lengths of EMT according to the present invention.

It is possible to adapt the linking connector concept described above to be a coupling used to connect two lengths of EMT. Referring now to FIG. 11, link coupling 70 is illustrated. As with linking connector 40, link coupling 70 comprises a first section 71 and a second section 72. Link coupling 70 also comprises hex-shaped separator 73. First section 71 is designed similar to first section 41 of linking connector 40, comprising barb access holes 77, ground holes 78, and set screw hole 79. However second section 72 is also designed to engage one of the ends 11 or 12 of a second length of EMT 10. This is done by making second section 72 a mirror image of first section 71. As such, second section 72 is also adapted to have a half sleeve 60 fitted around it.

Referring now to FIGS. 12 and 13, connection assembly 80 is illustrated. Connection assembly 80 comprises linking connector 40 and half sleeve 60. Linking connector 40 is described in detail above in relation to FIGS. 8–10. Half sleeve 60 is one half of sleeve connector 20, which is described in detail above. As such, a detailed explanation of the structure of these components will be omitted. Only the structural cooperation between half sleeve 60 and linking connector 40, when fitted together, will be discussed.

Half sleeve 60 has a C-shaped cross-sectional profile and is made of spring steel. Half sleeve 60 is sized and shaped so that it fits around first section 41 (FIG. 8) of linking connector 40. Outer ridge 53 helps ensure that half sleeve 60 is properly positioned. When half sleeve 60 is fitted around first section 41 (FIG. 8), the four barbs 25 of half sleeve 60 extend through corresponding barb access holes 47 of linking connector 40 (best visible in FIG. 13). As such, an end 11, 12 of EMT 10 (FIG. 1) can be inserted into link cavity 46 so that the barbs 25 will engage corresponding dimples 16 (FIG. 1).

Set screw hole 49 of linking connector 40 is substantially aligned with set screw hole 30 of half sleeve 60. Set screw 50 can then be extended through and threadily engage both set screw holes 49 and 30. When an end 11, 12 of EMT 10 (FIG. 1) is inserted into link cavity 46 and set screw 50 is incorporated, set screw 50 will contact the outer surface 13 of EMT 10 (FIG. 1). This will help form a ground path and secure the EMT 10 in place. As discussed earlier, the use of a set screw is not necessary and is preferably only used when the EMT end does not have indentations.

Additionally, ground tab holes 48 of linking connector 40 are substantially aligned with ground tabs 28 of half sleeve 60. Ground tabs 28 can be bent inward to extend through ground tab holes 48. When an end 11, 12 of EMT 10 (FIG. 1) is inserted into link cavity 46 and ground tabs 28 are bent inward, ground tabs 28 will contact the outer surface 13 of EMT 10 (FIG. 1).

Referring now to FIG. 14, EMT joint assembly 90 is illustrated. EMT joint assembly 90 comprises sleeve coupling 20 operably coupled with and connecting two lengths of EMT 10. The structure of sleeve coupling 20 and EMT 10 are discussed in detail above. When sleeve coupling 20 is used to couple two lengths of EMT 10, one of the ends 11, 12 of each EMT 10 is inserted into sleeve cavity 46 from opposite sides until they butt against inner ridge 27 (FIGS. 5–7).

When fully inserted into sleeve coupling 20, barbs 25 engage corresponding dimples 16 of EMTs 10, locking them in place. Set screws 31 are tightened so as to contact the EMTs 10. The use of a set screw is not necessary and is preferably only used when the EMT end does not have indentations. Ground tabs 28 are either bent inward so as to contact the EMTs 10 or can be pre-bent.

Alternatively, sleeve coupling 20 can be used to couple EMTs that do not have indentations or dimples. Additionally, if sleeve coupling 20 is replaced by connection assembly 80 (FIG. 12), a single length of EMT 10 can be connected to a junction box or other transition fitting.

While the invention has been described and illustrated in sufficient detail that those skilled in this art can readily make and use it, various alternatives, modifications, and improvements should become readily apparent without departing from the spirit and scope of the invention.

What is claimed is:

1. A sleeve device comprising;
a sleeve inner surface forming a sleeve cavity;
a sleeve outer surface;
a first sleeve end adapted to receive an end of a first length of EMT;
a second sleeve end which is a mirror image of the first sleeve end adapted to receive an end of a second length of EMT;

at least one barb on the sleeve inner surface at or near the first sleeve end, the barb adapted to engage a corresponding indentation on the first length of EMT; and at least one barb on the sleeve inner surface at or near the second sleeve end, the barb adapted to engage a corresponding indentation on the second length of EMT;

the sleeve device functioning to couple the first length of EMT and the second length of EMT.

2. The sleeve device of claim 1 further comprising at least one grounding tab.

3. The sleeve device of claim 1 further comprising a set screw hole extending through the sleeve outer surface and the sleeve inner surface.

4. The sleeve device of claim 3 further comprising a set screw threadily engaged and extending through the set screw hole.

5. The sleeve device of claim 1 constructed of spring steel.

6. The sleeve device of claim 1 comprising four of the barbs on the sleeve inner surface at or near the first sleeve end.

7. The sleeve device of claim 1 wherein the second sleeve end has the same barb arrangement as the first sleeve end.

8. The sleeve device of claim 1 having a C-shaped cross sectional profile.

9. The sleeve device of claim 1 further comprising: a grounding tab; a set screw threadily engaged and extending through the set screw hole; wherein the sleeve device is constructed of spring steel; four of the barbs at or near the first sleeve end; a second sleeve end having the same barb arrangement as the first sleeve end; and a middle inner ridge on the sleeve inner surface at or near a center of the sleeve device.

10. An EMT joint assembly comprising:

an EMT having an EMT inner surface forming a cavity, an EMT outer surface; an EMT first end, and one or more indentations in the EMT outer surface at or near the EMT first end, each of the one or more indentations engaging a corresponding barb from a sleeve device;

the sleeve device having a sleeve inner surface forming a cavity adapted to receive the EMT first end, a sleeve outer surface; a first sleeve end; a set screw hole extending through the sleeve outer surface and the sleeve inner surface; and the each of the one or more corresponding barbs on the sleeve inner surface at or near the first sleeve end.

11. An EMT joint assembly comprising:

an EMT having an EMT inner surface forming a cavity, an EMT outer surface; an EMT first end, and one or more indentations in the EMT outer surface at or near the EMT first end, each of the one or more indentations engaging a corresponding barb from a sleeve device;

the sleeve device having a sleeve inner surface forming a cavity adapted to receive the EMT first end, a sleeve outer surface; a first sleeve end; a middle stop on the sleeve inner surface at or near a center of the sleeve device, and the each of the one or more corresponding barbs on the sleeve inner surface at or near the first sleeve end.

\* \* \* \* \*